US012811745B2

(12) United States Patent
Barbu et al.

(10) Patent No.: US 12,811,745 B2
(45) Date of Patent: Nov. 24, 2026

(54) RESOURCES FOR REFERENCE SIGNAL TRANSMISSIONS

(71) Applicant: Nokia Technologies Oy, Espoo (FI)

(72) Inventors: Oana-Elena Barbu, Aalborg (DK); Ryan Keating, Naperville, IL (US); Diomidis Michalopoulos, Munich (DE)

(73) Assignee: Nokia Technologies Oy, Espoo (FI)

( * ) Notice: Subject to any disclaimer, the term of this patent is extended or adjusted under 35 U.S.C. 154(b) by 287 days.

(21) Appl. No.: 18/698,944

(22) PCT Filed: Oct. 19, 2021

(86) PCT No.: PCT/FI2021/050698

§ 371 (c)(1),
(2) Date: Apr. 5, 2024

(87) PCT Pub. No.: WO2023/067235

PCT Pub. Date: Apr. 27, 2023

(65) Prior Publication Data

US 2025/0226948 A1 Jul. 10, 2025

(51) Int. Cl.
*H04L 5/00* (2006.01)
*H04B 7/06* (2006.01)
(Continued)

(52) U.S. Cl.
CPC ....... *H04L 5/0051* (2013.01); *H04B 7/06952* (2023.05); *H04W 24/10* (2013.01); *H04W 64/00* (2013.01)

(58) Field of Classification Search
CPC ..... G01S 5/0036; G01S 5/0236; H04B 7/063; H04B 7/06952; H04B 7/0697;
(Continued)

(56) References Cited

U.S. PATENT DOCUMENTS 9,445,237 B1 * 9/2016 Nallampatti Ekambaram ............ H04W 4/023
11,089,565 B2 * 8/2021 Manolakos ........... H04L 5/0048
(Continued)

FOREIGN PATENT DOCUMENTS

WO 2020/146711 A1 7/2020
WO 2021/037331 A1 3/2021
WO 2021/064238 A1 4/2021

OTHER PUBLICATIONS

R1-2006972 "FL Summary for Potential Positioning Enhancements" 3GPP TSG RAN WG1 Meeting #102-e; May 25-Jun. 5, 2020. (Year: 2020).*

(Continued)

*Primary Examiner* — Stephen J Clawson
(74) *Attorney, Agent, or Firm* — Nokia Technologies Oy

(57) ABSTRACT

To determine resources for reference signal transmissions, for example for positioning, by a first apparatus (LMP), a second apparatus (TD), the first apparatus may transmit to the second apparatus a request (2-1) to measure and report spatial distribution metrics of reference signal transmissions (2-2, 2-3) over a plurality of beams from a plurality of transmission-reception points. The second apparatus performs one or more measurements (2-4) and sends one or more measurement reports (2-5) to the first apparatus. The first apparatus uses spatial distribution information over the plurality of beams in the one or more reports to determine (2-6) whether one or more time-frequency resources used by one beam are re-usable by at least another beam.

19 Claims, 5 Drawing Sheets

(51) Int. Cl.
*H04W 24/10* (2009.01)
*H04W 64/00* (2009.01)

(58) Field of Classification Search
CPC ... H04L 5/0048; H04L 5/0051; H04L 5/0067; H04W 24/10; H04W 64/00
USPC .......................................................... 370/329
See application file for complete search history.

(56) References Cited

U.S. PATENT DOCUMENTS

| | | | | |
|---|---|---|---|---|
| 11,638,122 | B2 | 4/2023 | Yilmaz et al. | |
| 12,108,349 | B2 * | 10/2024 | Cha | H04L 5/0023 |
| 2019/0123864 | A1 * | 4/2019 | Zhang | H04L 5/005 |
| 2019/0274053 | A1 * | 9/2019 | Wang | H04W 16/10 |
| 2019/0297603 | A1 * | 9/2019 | Guo | H04L 5/0051 |
| 2020/0037188 | A1 * | 1/2020 | Schrammar | H04W 24/10 |
| 2020/0053800 | A1 * | 2/2020 | Deng | H04B 7/0617 |
| 2020/0266942 | A1 * | 8/2020 | Akkarakaran | H04W 8/08 |
| 2020/0314662 | A1 * | 10/2020 | Shimizu | H04B 7/088 |
| 2020/0344712 | A1 * | 10/2020 | Akkarakaran | G01S 5/0268 |
| 2020/0351813 | A1 * | 11/2020 | Manolakos | H04W 24/10 |
| 2021/0006372 | A1 * | 1/2021 | Cha | H04L 5/0048 |
| 2021/0373118 | A1 * | 12/2021 | Bao | H04L 1/0003 |
| 2021/0409967 | A1 * | 12/2021 | Franke | H04W 16/28 |
| 2022/0174620 | A1 * | 6/2022 | Cha | H04W 56/006 |
| 2022/0187411 | A1 * | 6/2022 | Manolakos | H04L 5/0051 |
| 2022/0393748 | A1 * | 12/2022 | Hill | H04B 7/022 |
| 2022/0400465 | A1 * | 12/2022 | Opshaug | H04L 5/026 |
| 2023/0199701 | A1 * | 6/2023 | Cheema | H04L 5/0094 455/456.1 |
| 2023/0400549 | A1 * | 12/2023 | Duan | G01S 13/56 |
| 2025/0081007 | A1 * | 3/2025 | Manolakos | H04W 64/00 |

OTHER PUBLICATIONS

"3rd Generation Partnership Project; Technical Specification Group Radio Access Network; LTE Positioning Protocol (LPP) (Release 16)", 3GPP TS 37.355, V16.5.0, Jun. 2021, pp. 1-298.
"Revised WID on NR Positioning Enhancements", 3GPP TSG RAN Meeting #91e, RP-210903, Agenda: 9.7.25, Intel Corporation, Mar. 16-26, 2022, 6 pages.
"Solution directions to reduce end-to-end latency", 3GPP TSG-RAN WG2 Meeting #112 electronic, R2-2009023, Agenda: 8.11.2, Intel Corporation, Nov. 2-13, 2020, 12 pages.
"3rd Generation Partnership Project; Technical Specification Group Radio Access Network; NR; Radio Resource Control (RRC) protocol specification (Release 16)", 3GPP TS 38.331 V16.5.0, Jun. 2021, pp. 1-959.
International Search Report and Written Opinion received for corresponding Patent Cooperation Treaty Application No. PCT/FI2021/050698, dated Jul. 1, 2022, 16 pages.
"3rd Generation Partnership Project; Technical Specification Group Radio Access Network; NG Radio Access Network (NG-RAN); Stage 2 functional specification of User Equipment (UE) positioning in NG-RAN (Release 18)", 3GPP TS 38.305, V18.0.0, Dec. 2023, pp. 1-179.
Extended European Search Report received for corresponding European Patent Application No. 21961282.7, dated Apr. 24, 2025, 7 pages.
"Multi-TRP enhancements for beam management", 3GPP TSG RAN WG1 #106-e, R1-2107573, Intel Corporation, Agenda Item: 8.1.2.3, Aug. 16-27, 2021, 7 pages.

* cited by examiner

RESOURCES FOR REFERENCE SIGNAL TRANSMISSIONS

RELATED APPLICATION

This application was originally filed as PCT Application No. PCT/FI2021/050698, filed on Oct. 19, 2021, of which priority is claimed and is incorporated herein by reference in its entirety.

TECHNICAL FIELD

Various example embodiments relate to wireless communications.

BACKGROUND

Wireless communication systems are under constant development. New applications, use cases and industry verticals are to be envisaged with accurate positioning performance requirements. To position a user terminal, uplink and downlink reference signals are transmitted and measured.

BRIEF DESCRIPTION

According to an aspect there is provided an apparatus comprising at least one processor; and at least one memory including computer program code, the at least one memory and computer program code being configured to, with the at least one processor, cause the apparatus at least to perform: transmitting to a terminal device a request to measure and report spatial distribution metrics of reference signal transmissions over a plurality of beams from a plurality of transmission-reception points; receiving from the terminal device one or more measurement reports; using spatial distribution metrics information over the plurality of beams in the measurement reports to determine whether one or more time-frequency resources used by one beam are re-usable by at least another beam.

In an embodiment, the at least one memory and computer program code are configured to, with the at least one processor, cause the apparatus further to at least to perform: transmitting in the request one or more thresholds indicating when two or more beams measured are sufficiently spatially separable to allow re-use of the one or more time-frequency resources.

In embodiments, the at least one memory and computer program code are configured to, with the at least one processor, cause the apparatus further to at least to perform: checking reference signal types available for measurements at the terminal device; selecting one or more reference signal types to be measured; and transmitting in the request information on the one or more reference signal types selected.

In embodiments, the at least one memory and computer program code are configured to, with the at least one processor, cause the apparatus further to at least to perform: requesting to measure and report difference in sparsity and/or difference in delays and/or difference in downlink angles of arrival and/or difference in reception powers and/or one or more groups of beams that are spatially separable.

In embodiments, the at least one memory and computer program code are configured to, with the at least one processor, cause the apparatus further to at least to perform: transmitting to a second terminal device a request to measure and report spatial distribution metrics of reference signal transmissions; receiving from the second terminal device one or more measurement reports; and in response to determining that the one or more time-frequency resources, which are reusable for the terminal device, are not re-usable for the second terminal device, transmitting to the second terminal device information not to measure reference signal transmissions transmitted on the reusable time-frequency resources.

In embodiments, the at least one memory and computer program code are configured to, with the at least one processor, cause the apparatus further to at least to perform: in response to the one or more time-frequency resources being re-usable for the terminal device over two or more beams, reconfiguring position reference signal transmissions from transmission-reception points having the two or more beams to use the one or more time-frequency resources for position reference signal transmissions.

According to an aspect there is provided an apparatus comprising at least one processor; and at least one memory including computer program code, the at least one memory and computer program code being configured to, with the at least one processor, cause the apparatus at least to perform: receiving, from a location management point, a request to measure and report spatial distribution metrics of reference signal transmissions from a plurality of transmission-reception points; performing one or more measurements on the reference signal transmissions received over a plurality of beams from the plurality of the transmission-reception points; and transmitting measured spatial distribution information over the plurality of beams in one or more reports to the location management point.

In an embodiment, the at least one memory and computer program code are configured to, with the at least one processor, cause the apparatus further at least to perform: sweeping through at least part of reception beams of the apparatus; and determining and reporting, per a detected beamed reference signal, difference in sparsity and/or difference in delays and/or difference in downlink angle of arrival and/or difference in reception power and/or one or more groups of spatially separable transmission-reception points.

In embodiments, the at least one memory and computer program code are configured to, with the at least one processor, cause the apparatus further to at least to perform: measuring downlink angle of arrival to a direction of a reception beam to determine downlink angle of arrival.

In embodiments, the at least one memory and computer program code are configured to, with the at least one processor, cause the apparatus further to at least to perform: using, per a beam, a direction of strongest multipath component to estimate a refined angle of arrival; and determining and reporting difference in downlink angle of arrival using the refined angle of arrival.

In embodiments, the at least one memory and computer program code are configured to, with the at least one processor, cause the apparatus further to at least to perform: reporting measurement results that are above a threshold, which indicates when two or more beams measured are sufficiently spatially separable to allow re-use of the one or more time-frequency resources, wherein the threshold is preset to the apparatus or received in the request from the location management point.

In embodiments, the at least one memory and computer program code are configured to, with the at least one processor, cause the apparatus further to at least to perform: determining trust level per a difference to be reported; and associating in a report the difference with its trust level.

In embodiments, the at least one memory and computer program code are configured to, with the at least one processor, cause the apparatus further to at least to perform: transmitting the measured spatial distribution information in an on-demand positioning request.

According to an aspect there is provided a method comprising: transmitting to a terminal device a request to measure and report spatial distribution metrics of reference signal transmissions over a plurality of beams from a plurality of transmission-reception points; receiving from the terminal device one or more measurement reports; and using spatial distribution metrics information over the plurality of beams in the measurement reports to determine whether one or more time-frequency resources used by one beam are re-usable by at least another beam.

In an embodiment, the method further comprises: transmitting in the request one or more thresholds indicating when two or more beams measured are sufficiently spatially separable to allow re-use of the one or more time-frequency resources.

In embodiments, the method further comprises: checking reference signal types available for measurements at the terminal device; selecting one or more reference signal types to be measured; and transmitting in the request information on the one or more reference signal types selected.

In embodiments, the method further comprises: requesting to measure and report difference in sparsity and/or difference in delays and/or difference in downlink angles of arrival and/or difference in reception powers and/or one or more groups of beams that are spatially separable.

In embodiments, the method further comprises: transmitting to a second terminal device a request to measure and report spatial distribution metrics of reference signal transmissions; receiving from the second terminal device one or more measurement reports; in response to determining that the one or more time-frequency resources, which are reusable for the terminal device, are not reusable for the second terminal device, transmitting to the second terminal device information not to measure reference signal transmissions transmitted on the reusable time-frequency resources.

In embodiments, the method further comprises: in response to the one or more time-frequency resources being re-usable for the terminal device over two or more beams, reconfiguring position reference signal transmissions from transmission-reception points having the two or more beams to use the one or more time-frequency resources for position reference signal transmissions.

According to an aspect there is provided a method comprising: receiving, from a location management point, a request to measure spatial distribution metrics of reference signal transmissions from a plurality of transmission-reception points; performing one or more measurements on the reference signal transmissions received over a plurality of beams from the plurality of the transmission-reception points; and transmitting spatial distribution information over the plurality of beams in one or more reports to the location management point.

In an embodiment, the method further comprises: sweeping through at least part of reception beams of the apparatus; and determining and reporting, per a detected beamed reference signal, difference in sparsity and/or difference in delays and/or difference in downlink angle of arrival and/or difference in reception power and/or one or more groups of spatially separable transmission-reception points.

In embodiments, the method further comprises: measuring downlink angle of arrival to a direction of a reception beam to determine downlink angle of arrival.

In embodiments, the method further comprises: using, per a beam, a direction of strongest multipath component to estimate a refined angle of arrival; and determining and reporting difference in downlink angle of arrival using the refined angle of arrival.

In embodiments, the method further comprises: reporting measurement results that are above a threshold, which indicates when two or more beams measured are sufficiently spatially separable to allow re-use of the one or more time-frequency resources, wherein the threshold is preset to the apparatus or received in the request from the location management point.

In embodiments, the method further comprises: determining trust level per a difference to be reported; and associating in a report the difference with its trust level.

In embodiments, the method further comprises: transmitting the measured spatial distribution information in an on-demand positioning request.

According to an aspect there is provided a computer readable medium comprising program instructions for causing an apparatus to perform at least the following: transmitting to a terminal device a request to measure and report spatial distribution metrics of reference signal transmissions over a plurality of beams from a plurality of transmission-reception points; and in response to receiving from the terminal device one or more measurement reports, using spatial distribution metrics information over the plurality of beams in the measurement reports to determine whether one or more time-frequency resources used by one beam are re-usable by at least another beam.

According to an aspect there is provided a computer readable medium comprising program instructions for causing an apparatus to perform at least the following: in response to receiving, from a location management point, a request to measure spatial distribution metrics of reference signal transmissions from a plurality of transmission-reception points, performing one or more measurements on the reference signal transmissions received over a plurality of beams from the plurality of the transmission-reception points; and transmitting spatial distribution information over the plurality of beams in one or more reports to the location management point.

In embodiments, the computer readable medium is a non-transitory computer readable medium.

According to an aspect there is provided a computer program comprising instructions which, when the program is executed by an apparatus, cause the apparatus to perform at least the following: transmitting to a terminal device a request to measure and report spatial distribution metrics of reference signal transmissions over a plurality of beams from a plurality of transmission-reception points; and in response to receiving from the terminal device one or more measurement reports, using spatial distribution metrics information over the plurality of beams in the measurement reports to determine whether one or more time-frequency resources used by one beam are re-usable by at least another beam.

According to an aspect there is provided a computer program comprising instructions which, when the program is executed by an apparatus, cause the apparatus to perform at least the following: in response to receiving, from a location management point, a request to measure spatial distribution metrics of reference signal transmissions from a plurality of transmission-reception points, performing one or more measurements on the reference signal transmissions received over a plurality of beams from the plurality of the transmission-reception points; and transmitting spatial distribution information over the plurality of beams in one or more reports to the location management point.

BRIEF DESCRIPTION OF DRAWINGS

Embodiments are described below, by way of example only, with reference to the accompanying drawings, in which.

DETAILED DESCRIPTION OF SOME EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned. Further, although terms including ordinal numbers, such as "first", "second", etc., may be used for describing various elements, the structural elements are not restricted by the terms. The terms are used merely for the purpose of distinguishing an element from other elements. For example, a first signal could be termed a second signal, and similarly, a second signal could be also termed a first signal without departing from the scope of the present disclosure.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. The embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
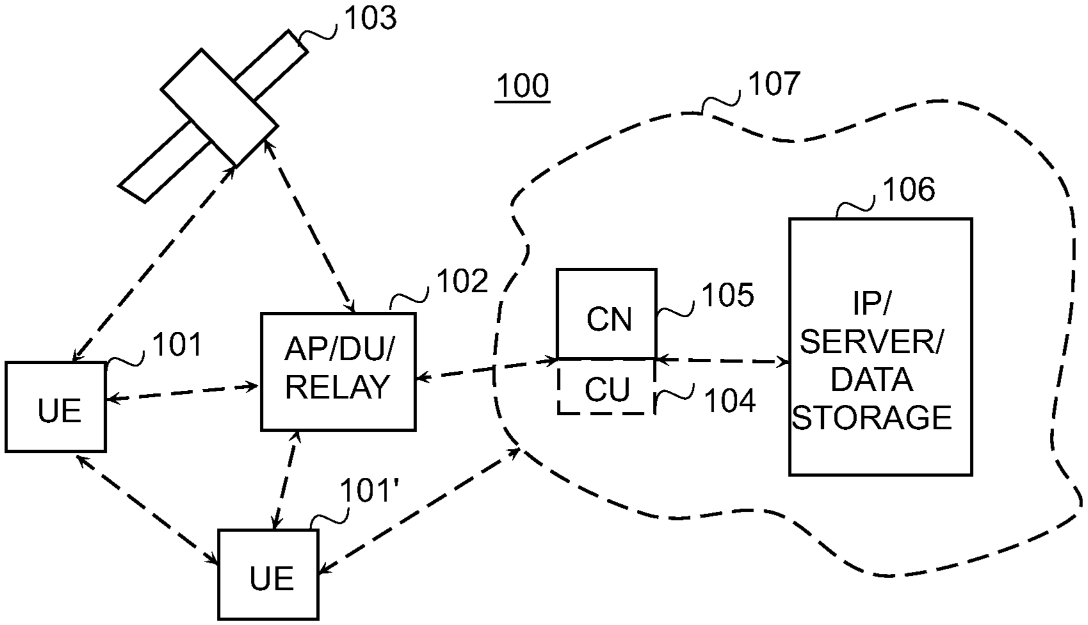
FIG. 1 illustrates an exemplified wireless communication system.

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system 100 given as an example but a person skilled in the art may apply the solution to other communication systems provided with necessary properties.

The example of FIG. 1 shows a part of an exemplifying radio access network.

FIG. 1 shows user devices 101, 101' configured to be in a wireless connection on one or more communication channels with a node 102. The node 102 is further connected to a core network 105. In one example, the node 102 may be an access node such as (e/g) NodeB providing or serving devices in a cell. In one example, the node 102 may be a non-3GPP access node. The physical link from a device to a (e/g) NodeB is called uplink or reverse link and the physical link from the (e/g) NodeB to the device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used for signaling purposes. The (e/g) NodeB is a computing device configured to control the radio resources of communication system it is coupled to. The NodeB may also be referred to as a base station, an access point or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to devices. The antenna unit may comprise a plurality of antennas or antenna elements. The (e/g) NodeB is further connected to the core network 105 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), or access and mobility management function (AMF), etc.

The user device (also called UE, user equipment, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station.

The user device typically refers to a device (e.g. a portable or non-portable computing device) that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a device may also be a nearly exclusive uplink only device, of which an example is a camera or video camera loading images or video clips to a network. A device may also be a device having capability to operate in Internet of Things (IoT) network which is a scenario in which objects are provided with the ability to transfer data over a network without requiring human-to-human or human-to-computer interaction, e.g. to be used in smart power grids and connected vehicles. The user device may also utilize cloud. In some applications, a user device may comprise a user portable device with radio parts (such as a watch, earphones, eyeglasses, other wearable accessories or wearables) and the computation is carried out in the cloud. The device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors micro-controllers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz—cmWave, below 6 GHz—cmWave—mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and fully centralized in the core network. The low latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks, such as a public switched telephone network or the Internet 106, or utilize services provided by them. The communication network may also be able to support the usage of cloud services, for example at least part of core network operations may be carried out as a cloud service (this is depicted in FIG. 1 by "cloud" 107). The communication system may also comprise a central control entity, or a like, providing facilities for networks of different operators to cooperate for example in spectrum sharing.

The technology of Edge cloud may be brought into a radio access network (RAN) by utilizing network function virtualization (NVF) and software defined networking (SDN). Using the technology of edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloudRAN architecture enables RAN real time functions being carried out at the RAN side (in a distributed unit, DU 102) and non-real time functions being carried out in a centralized manner (in a centralized unit, CU 104).

It should also be understood that the distribution of labour between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or nodeB (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite 103 in the mega-constellation may cover several satellite-enabled network entities that create on-ground cells. The on-ground cells may be created through an on-ground relay node 102 or by a gNB located on-ground or in a satellite.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

For fulfilling the need for improving the deployment and performance of communication systems, the concept of "plug-and-play" (e/g) NodeBs has been introduced. Typically, a network which is able to use "plug-and-play" (e/g) Node Bs, includes, in addition to Home (e/g) NodeBs (H (e/g) nodeBs), a home node B gateway, or HNB-GW (not shown in FIG. 1). A HNB Gateway (HNB-GW), which is typically installed within an operator's network may aggregate traffic from a large number of HNBs back to a core network.

In 5G and beyond, it is envisaged that use of smart devices, that may move, will increase thereby posing different latency and accuracy requirements for positioning the smart devices in connected robotics and autonomous systems, for example. A non-limiting list of examples of such mobile smart devices include unmanned mobility with fully autonomous connected vehicles, other vehicle-to-everything (V2X) services, or smart industry with different Industrial Internet of Things (IIoT) devices, such as automated guided vehicles or mobile robots or mobile robot arms. Naturally, for positioning of terminal devices, like smart phones or smart wearable devices, including different smart accessories, or other user devices, different latency and accuracy requirements for positioning them may also be posed. Below term terminal device is used to cover all kind of devices that can be positioned, and/or that contain movable parts that can be positioned, including the above listed examples of user devices and smart devices, without limiting terminal devices to the listed examples.

In 5G and beyond, it is envisaged that a terminal device's position is estimated by a core network element called a location management function, LMF. However, at least part of the location management function may be distributed to be performed at the radio access network, or even in terminal devices. Hence, herein a term location management point (LMP) is used to cover all above listed possibilities. In other words, the term location management point covers any apparatus, including any node or device or entity, configured to act as the location management point to determine (estimate, calculate) positions of one or more terminal devices. A terminal device's position may be estimated based on measurements performed by the terminal device on signal transmissions (e.g. reference signal transmissions) received from one or more transmission-reception points, i.e. based on downlink measurements, and/or by measurements performed by transmission-reception points on signal transmissions received from the user device, i.e. based on uplink measurements. However, the details how the terminal devices are finally positioned are not relevant for the implementations described herein, and hence there is no need to describe them in more detail herein.

A transmission-reception point is an apparatus providing access to the radio network. The transmission-reception point may be a base station or an access node, or an operational entity comprising one or more antennas in a base station, or an operational entity comprising one or more remote radio heads, or a remote antenna of a base station, or any other set of geographically co-located antennas forming one operational entity, for example an antenna array with one or more antenna elements, for one cell in the radio access network, or for a part of the one cell. In other words, one cell may include one or multiple transmission points, and cells in the radio access network comprise transmission-reception points. For the positioning, the transmission-reception points are configured to transmit different reference signal transmissions to terminal devices, and they may be configured to measure corresponding signal transmissions from terminal devices.

In 5G and beyond, reference signal transmissions may be transmitted using directional beams. In a concept called on-demand positioning reference signals, positioning reference signal transmissions are transmitted only to directions where there is, per a direction, at least one terminal device which will receive and process the positioning reference signal transmissions for deriving location of the terminal device. A further requirement is that the radio access network can provide increased positioning reference signal resources, for example, increased bandwidth and/or increased periodicity of positioning reference signal occasions, to designated areas in which there is a need for higher accuracy of the positioning, for example.

Figure 2:
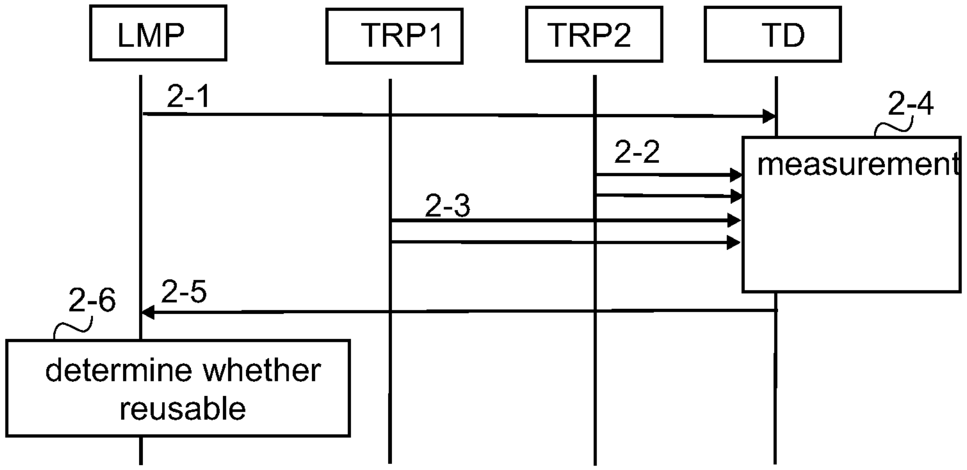
FIGS. 2 and 3 illustrate examples of information exchange.
Figure 3:
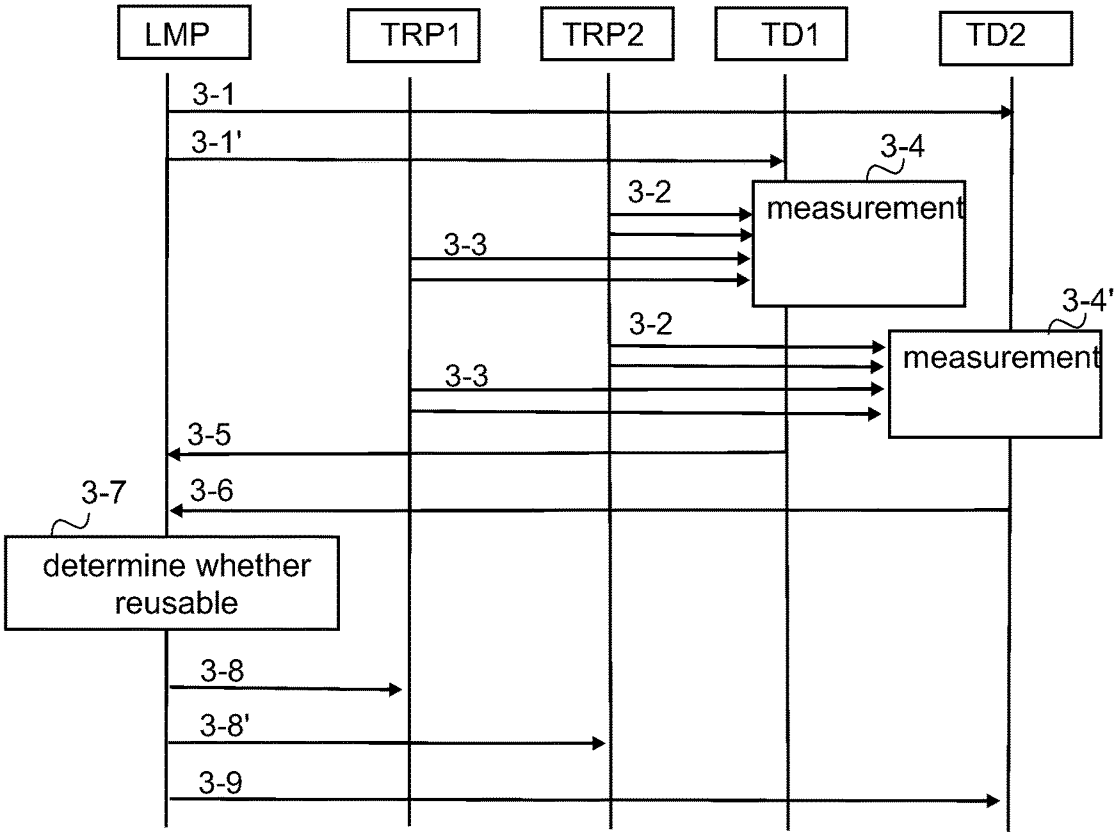

FIGS. 2 and 3 illustrate examples of resource allocation that may be implemented with the on-demand positioning reference signals concept, without limiting the examples to such an implementation and terminology. In both Figures it is assumed that the terminal device (FIG. 2), or the terminal devices (FIG. 3) have reported in capability reporting ability to measure multiple transmission beams at the same time, for example using digital or hybrid beamforming. For example, a terminal device may indicate its ability to measure multiple transmission beams at the same time by reporting a number of beam it can use at the same time.

Referring to FIG. 2, the illustrated example starts when a location management point LMP transmits to a terminal device TD in message 2-1 a request to measure and report spatial distribution metrics of reference signal transmissions over a plurality of beams from a plurality of transmission-reception points, depicted in FIG. 2 by TRP1 and TRP2. The request in message 2-1 may request the TD to measure and report difference in sparsity and/or difference in delays and/or difference in downlink angles of arrival and/or difference in reception powers and/or one or more groups of beams that are spatially separable. Naturally instead of reporting difference, sparsity and/or delays and/or angles of arrival and/or reception powers may be reported, or a report may be a combination of having some metrics as differences, some as measured. In other words, the terminal device TD is configured by the location management point to measure one or more metrics that characterize spatial characteristics of transmission beams from the transmission-reception points from the terminal device point of view. Hence, message 2-1 may be a request to measure spatial distribution metrics of reference signals. Message 2-1 may be transmitted directly to the terminal device TD over the LTE Positioning Protocol (LPP), or over the radio access network using a radio resource control message or medium access control element (MAC CE).

Further, depending on an implementation, the request (message 2-1) may contain one or more thresholds, which may indicate to the terminal device, when two or more beams measured are sufficiently spatially separable to allow reuse of the one or more time-frequency resources. The terminal device may use the one or more thresholds to determine whether or not two or more beams measured are sufficiently spatially separable, as will be described in more detail with FIG. 10.

When the transmission-reception points TRP1, TRP2 transmit reference signal transmissions (messages 2-2 from TRP2, messages 2-3 from TRP1) over beams directed towards the TD, so that the terminal device TD can receive the transmissions, the terminal device TD performs (block 2-4) one or more measurements on the reference signal transmissions received over a plurality of beams from the plurality of the transmission-reception point, as requested in the received message 2-1, and transmits measured spatial distribution information over the plurality of beams in one or more reports (message 2-5) to the location management point. The terminal device TD may perform in block 2-4 the measurements by sweeping through at least part of reception beams of the terminal device, or sweeping through all reception beams of the terminal device. Depending on an implementation, and what metrics were requested to be reported, the measuring and reporting (block 2-4) may include that the terminal device determines, per a detected beamed reference signal, i.e. per a beam over which a reference signal is detected, one or more values to report. For example, the one or more reports may comprise one or more differences in sparsity and/or one or more differences in delays and/or one or more differences in downlink angles of arrival and/or one or more differences in reception power and/or one or more groups of spatially separable transmission-reception points. Further examples what the one or more reports may comprise are given above. Message 2-5 may be a new information element over an LPP interface transmitted directly to the location management point or a message transmitted over the radio access network in a radio resource control message.

Message 2-5 may be an on-demand positioning request. In other words, the metrics may be part of the on-demand positioning request transmitted by the terminal device TD.

Upon receiving from the terminal device TD the one or more measurement reports (message 2-5), the location management point LMP uses in block 2-6 the spatial distribution information over the plurality of beams in the measurement reports to determine whether one or more time-frequency resources used by one beam are re-usable by at least another beam. Examples of when resources are considered to be re-usable are given below with FIGS. 4 to 6. Assuming that a first resource (first time-frequency resource) is allocated to TRP1 for reference signal transmissions to the terminal device, the first resource is a re-usable resource, if the first resource, or at least part of it, can be allocated to one or more further beams for reference signal transmissions to the terminal device. For example, if a resource is a physical resource block, it is a re-usable resource, if two or more beams can use the same physical resource block and yet the terminal device is able to detect the transmissions on the two or more beams. The one or more further beams may be beams of different transmission-reception points and/or beams of one transmission-reception point.

Referring to FIG. 3, the illustrated example starts when a location management point LMP transmits to terminal devices TD1 and TD2 in messages 3-1, 3-1' a request to measure and report spatial distribution metrics of reference signal transmissions over a plurality of beams from a plurality of transmission-reception points, depicted in FIG. 3 by TRP1 and TRP2. When the transmission-reception points TRP1, TRP2 transmit reference signal transmissions (messages 3-2 from TRP2, messages 3-3 from TRP1) over beams directed towards the TD1 and TD2, so that the terminal devices TD1 and TD2 can receive the transmissions, the terminal devices TD1, TD2 perform (blocks 3-4, 3-4') one or more measurements on the reference signal transmissions received over a plurality of beams from the plurality of the transmission-reception point, as requested in the corresponding received message 3-1, 3-1', and transmit measured spatial distribution information over the plurality of beams in one or more reports (message 3-5 from TD1, message 3-6 from TD2) to the location management point. Per a terminal device, the performed functionality and information exchange is similar to what is described above with FIG. 2.

The location management point LMP uses in block 3-7 the spatial distribution information over the plurality of beams in the measurement reports to determine whether one or more time-frequency resources used by one beam are reusable by at least another beam. In the illustrated example it is assumed that one or more time-frequency resources, which are reusable over two or more beams for the terminal device TD1, are not re-usable over the two or more beams for the terminal device TD2. However, in the illustrated example, the location management point LMP still reconfigures (messages 3-8, 3-8') reference signal transmissions from transmission-reception points TRP1 and TRP2 having the two or more beams to use the one or more reusable time-frequency resources for reference signal transmissions. Messages 3-8, 3-8' may be multicast messages or unicast messages that may be transmitted over New Radio Positioning Protocol Annex (NRPPa) interface. Message 3-8, 3-8' may comprise a list of physical resource blocks associated with each beam in the transmission-reception point. A unicast message 3-8, 3-8' may comprise physical resource block selection for its target transmission-reception point, or comprise the physical resource block selection for its target transmission-reception point and a list of beams (transmission-reception point beams) that share the selected physical resource blocks.

Further, in the illustrated example, the location management point LMP transmits (message 3-9) to the terminal device TD2 information not to measure reference signal transmissions transmitted on the reusable time-frequency resources. In another implementation, no message 3-9 is transmitted.

As can be seen from the above example, the location management point LMP may collect measurement reports from several terminal devices and use the measurement reports to generate a physical resource block reuse scheme across transmission-reception points, for example. Reusing resources across transmission-reception points increases resource utilization efficiency. Further, by the location management point utilizing measurement reports, and configuring transmission-reception points with resources for reference signal transmission, as described above, avoids measurement gap configuration related signalling between transmission-reception points and terminal devices, thereby reducing positioning latency.

Figure 4:
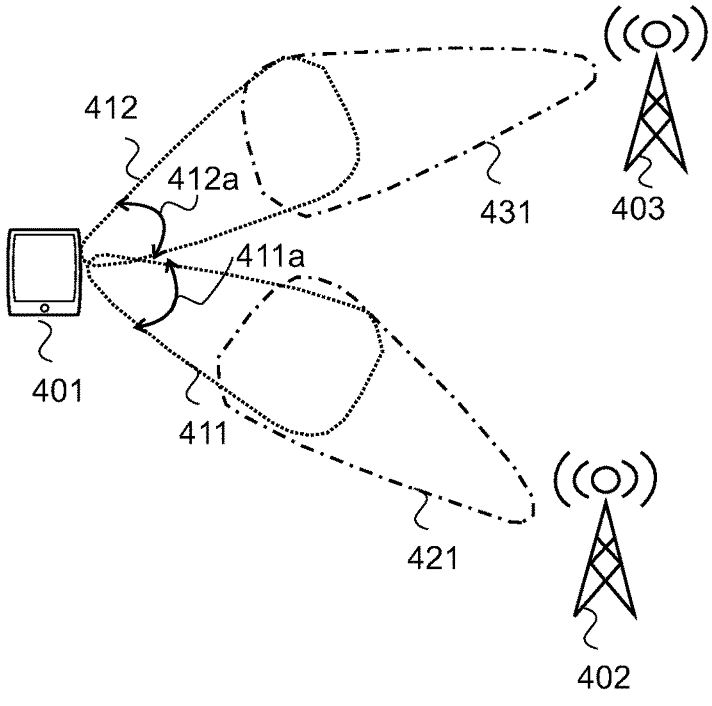
FIGS. 4 to 6 are block diagrams illustrating examples of beam pairs and spatial distribution.
Figure 5:
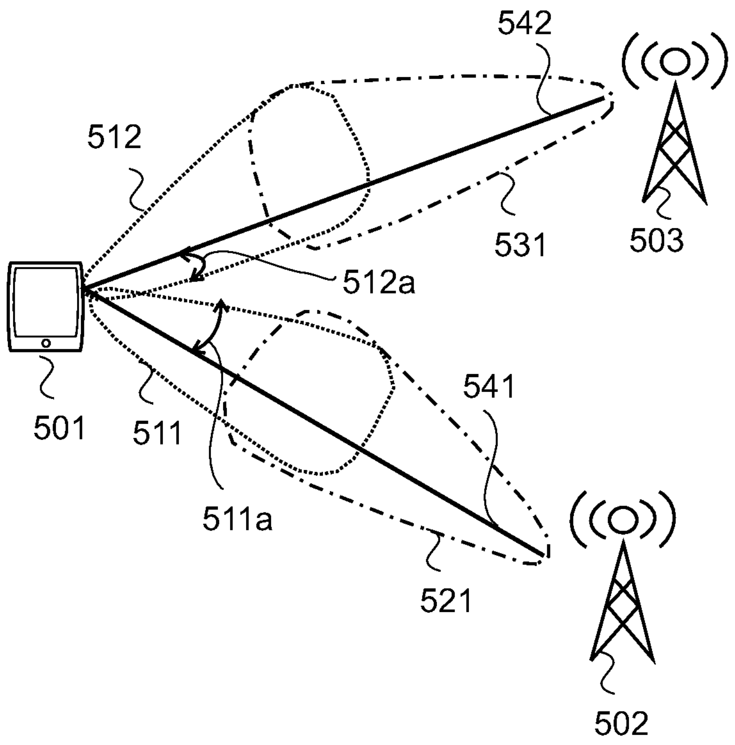
Figure 6:
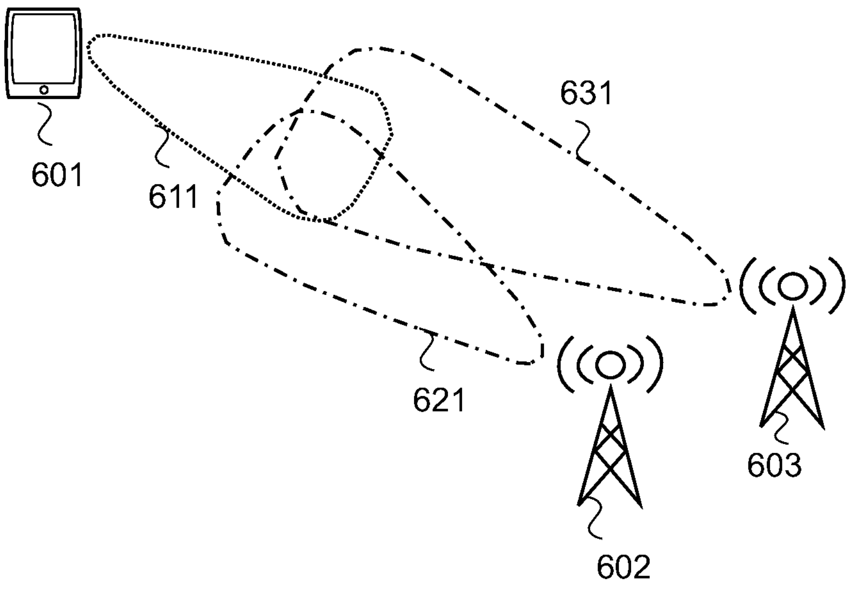

FIGS. 4 to 6 are block diagrams illustrating examples of beam pairs and spatial distribution indicating re-usability of time-frequency resources. In other words, in the illustrated examples, information about the spatial separation of two different beams, in the illustrated example from two different transmission-reception points, is used to determine whether the pair can reuse the same, or overlapping, time-frequency resource. The time-frequency resource may comprise one or more physical resource blocks. It should be appreciated that in FIGS. 4 and 5, one pair of beams are used as a non-limiting example of groups of beams that are spatially separable; the groups of beams may comprise, for example, several pairs of beams, or several groups of beams, a group comprising three or more beams in which resource on one of the transmission beams is re-usable on the other ones of the transmission beams in the group.

Referring to FIG. 4, the terminal device 401 sweeps over its reception beams and detects on beams 411, 412 beamed reference signal transmissions, on beam 411 a reference signal transmission over a transmission beam 421 from a transmission-reception point 402, and over a transmission beam 431 from a transmission-reception point 431. The terminal device measures, and may report, per a beamed reference signal transmission, downlink angle of arrival, to a direction of a reception beam 411, 412 to determine downlink angle of arrival 411*a*, 412*a*. Since in the illustrated example of FIG. 4, one transmission beam is detected by one reception beam, resource on one of the transmission beams is re-usable on the other one of the transmission beams.

Referring to FIG. 5, the terminal device 501 sweeps over its reception beams and detects on beams 511, 512 beamed reference signal transmissions, on beam 511 a reference signal transmission over a transmission beam 521 from a transmission-reception point 502, and over a transmission beam 531 from a transmission-reception point 531. In the illustrated example, the terminal device 501 uses, per a beam, a direction of strongest multipath component 541, 542 to estimate a refined angle of arrival 511*a*, 512*a*, and may report a difference in downlink angle of arrival using the refined angle of arrival 511*a*, 512*a*. Since in the illustrated example of FIG. 5, one transmission beam is detected by one reception beam, resource on one of the transmission beams is re-usable on the other one of the transmission beams.

Referring to FIG. 6, the terminal device 601 sweeps over its reception beams and detects on one beam 611 beamed reference signal transmissions, a reference signal transmission over a transmission beam 621 from a transmission-reception point 602, and over a transmission beam 631 from a transmission-reception point 631. Since in the illustrated example of FIG. 6, two transmission beams are detected by one reception beam, resource on one of the transmission beams is not re-usable on the other one of the transmission beams.

For example, combining the examples of FIGS. 3, 5 and 6, TD1 may be 501 and TD2 601, TRP1 may be depicted by 502 and 602, and TRP2 may be depicted by 503, 603. Hence, the terminal devices see the beams from the transmission-reception points differently.

The different situations in FIG. 6, compared to the situation in FIG. 5 or 4, illustrates that the metrics to be measured should capture information regarding the spatial separation of different transmission beams from transmission-reception points. For example, the terminal device may report a difference between a number of relevant reflections of any beamed reference signal pair and/or delays of the relevant reflections of any beamed reference signal pair. (Herein a relevant reflection means a channel tap with a power no less than x dB away from the dominant path (strongest multipath). If the report indicates that the terminal device has measured (observed) the same reflection (within a certain threshold) in the two beams, the location management point may conclude that the beams are spatially overlapping, and hence resources are not re-usable. Other examples of metrics that may be reported are given above with FIG. 2.

FIGS. 7 to 10 are flow chart illustrating different functionalities that may be combined with the above examples and implementations, including the implementations described with other flow charts.

Figure 7:
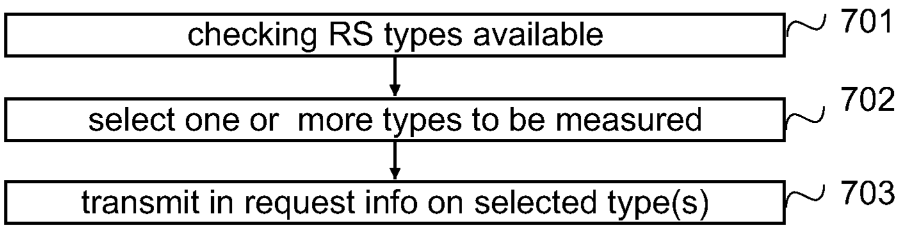
FIGS. 7 to 10 are flow charts illustrating example functionalities.

FIG. 7 illustrates functionality of the location management point in an implementation in which the request to measure and report spatial distribution metrics of reference signal transmissions also indicates one or more reference signal types.

Referring to FIG. 7, the location management point may check in block 701 reference signal types available for measurements at the terminal device, and then select in block 702 one or more reference signal types to measured. Information on the one or more reference signal types selected is then transmitted in block 703 in the request to measure and report. (Upon receiving the one or more types, the terminal device measures and reports correspondingly.)

For example, the location management point may be configured to select the type to be positioning reference signal, if positioning reference signal transmissions have already been activated by the location management point for other positioning session and the positioning reference signal transmissions are still ongoing. Otherwise another reference signal type, for example a synchronization signal block, SSB, or reference signal for channel state information, CSI-RS, transmissions of which can be quasi-colocationed with positioning reference signal resources, may be selected to be reference signals to be measured and reported for positioning.

The location management point and terminal devices may be configured to use trust levels with reported metrics.

Figure 8:
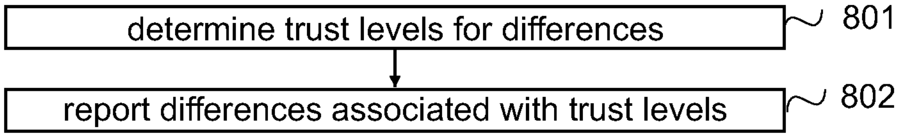

Referring to FIG. 8, a terminal device may be configured to determine (block 801), per a difference to be reported, a trust level of the difference. The trust level may be seen as a quality indicator or quality metric. A high trust level indicates that the metric is well measured. The trust level may be a variance of the measurement, and/or a reference signal received power of the measurement, or a value calculated from the variance and the reference signal received power, just to mention non-limiting examples of a trust level. Further, the terminal device may be configured to report (block 802) the differences associated with corresponding trust levels, a difference associated with its trust level.

Figure 9:
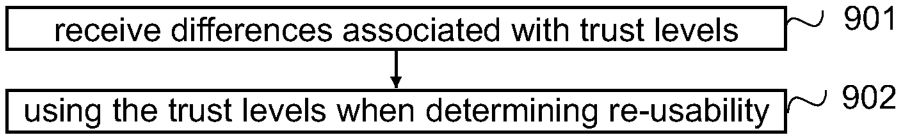

Referring to FIG. 9, when the location management point receives in block 901 a report comprising differences associated with corresponding trust levels, it uses in block 902 the trust levels when determining the re-usability of time-frequency resources. For example, difference with low trust levels may be left out when the re-usability is determined.

The terminal devices may be configured to use thresholds.

Figure 10:
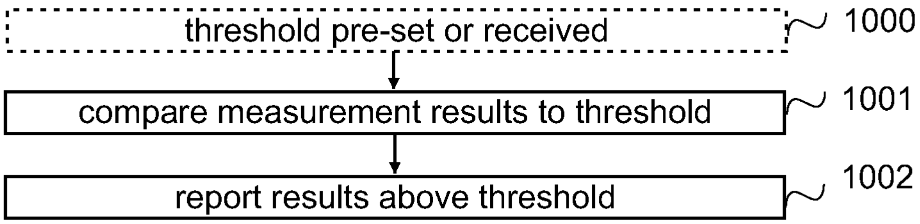

Referring to FIG. 10, depending on an implementation, one or more thresholds (block 1000) may be pre-set by the terminal device and/or received from the location management point in the request to measure and report, or in a request to measure. A threshold may indicate when two or more beams measured are sufficiently spatially separable to allow re-use of the one or more time-frequency resources. For example, the location management point may be configured to determine the thresholds based on quality of service requirements or past information on how much angle of arrival or reception should vary in order to consider interference manageable between two beams, i.e. to consider the beams sufficiently well separated.

The terminal device compares in block 1001 measurements results to the one or more thresholds, and reports in block 1002 results that are above the one or more thresholds.

The terminal device may indicate, directly or indirectly, in the report to the location management point whether or not the two or more beams measured are sufficiently spatially separable. For example, the terminal device may not report differential measurement results for a pair of reference signal transmissions, if at least one of the transmissions is received with a power below the threshold. Alternatively or in addition to the previous example, the indication may be realized by using one-bit indicator, for example. Thus, the spatial distribution information or spatial distribution metrics information transmitted from the terminal device may comprise measurement results (for example to be used by the location management point to determine whether or not the beams are spatially separable) or an explicit indication (i.e. determined locally at the terminal device) about the spatial separability. In some examples it may even be possible to indicate both to the location management point.

The use of the threshold(s) makes it possible to the terminal device to evaluate the metrics, for example power or angle, locally, and then indicate in the report which beams can be separated. For example, the terminal device may send, as the report, a list of beams from transmission-reception points (TRP transmission beams) that can be grouped together, thereby accounting for efficient terminal reporting.

The blocks, related functions, and information exchanges described above by means of FIGS. 2 to 10 are in no absolute chronological order, and some of them may be performed simultaneously or in an order differing from the given one. Other functions can also be executed between them or within them, and other information may be transmitted, and/or other rules applied or selected. Some of the blocks or part of the blocks or one or more pieces of information can also be left out or replaced by a corresponding block or part of the block or one or more pieces of information.

Figure 11:
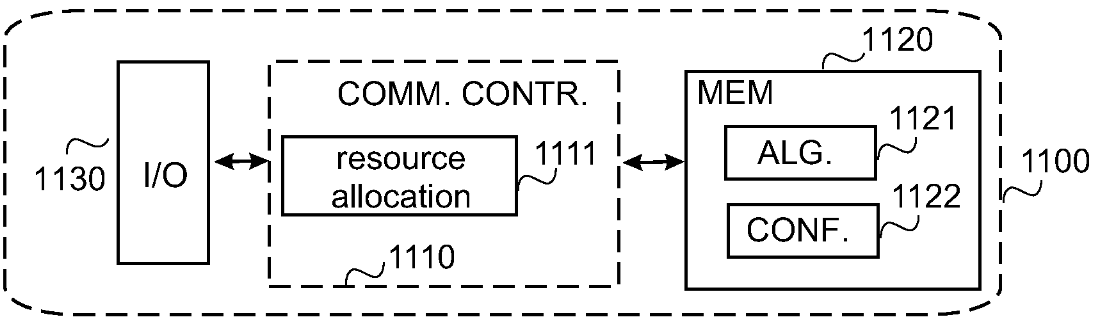
FIGS. 11 and 12 are schematic block diagrams.
Figure 12:
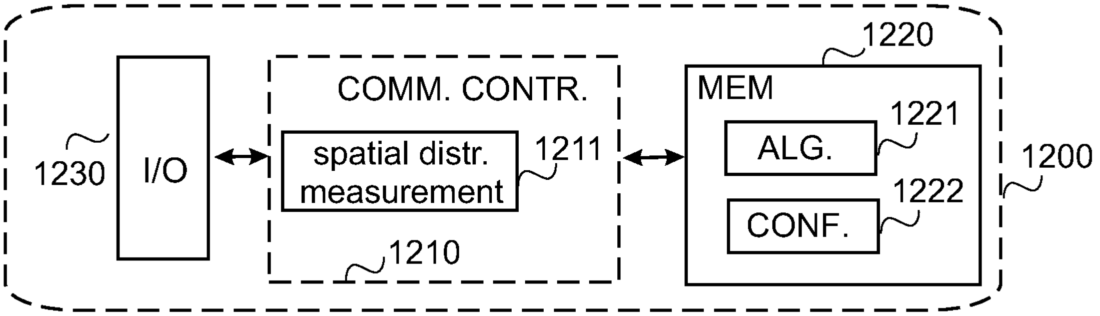

FIGS. 11 and 12 illustrate apparatuses comprising a communication controller 1110, 1210 such as at least one processor or processing circuitry, and at least one memory 1120, 1220 including a computer program code (software, algorithm) ALG. 1121, 1221, wherein the at least one memory and the computer program code (software, algorithm) are configured, with the at least one processor, to cause the respective apparatus to carry out any one of the embodiments, examples and implementations described above. FIG. 11 illustrates an apparatus, for example a network apparatus or a user equipment, configured to provide location management point (location management function), or any corresponding apparatus, suitable for positioning terminal devices and for configuring transmission reception points and apparatuses of FIG. 12 for measuring and reporting, and FIG. 12 illustrates an apparatus, for example user equipment, or terminal device in a vehicle, to measure and report reference signals as configured by apparatus of FIG. 11. The apparatuses of FIGS. 11 and 12 may be electronic devices, examples being listed above with FIGS. 1 and 2. It should be appreciated that an apparatus may be a combination of the apparatuses in Figure s 11 and 12.

Referring to FIGS. 11 and 12, the memory 1120, 1220 may be implemented using any suitable data storage technology, such as semiconductor based memory devices, flash memory, magnetic memory devices and systems, optical memory devices and systems, fixed memory and removable memory. The memory may comprise a configuration storage CONF. 1121, 1221, such as a configuration database, for example for storing at least temporarily measurement and report configurations and/or spatial information. The memory 1120, 1220 may further store other data, such as a data buffer for data waiting to be processed (including transmission).

Referring to FIG. 11, the apparatus, for example network apparatus comprising a location management function, comprises a communication interface 1130 comprising hardware and/or software for realizing communication connectivity according to one or more wireless and/or wired communication protocols. The communication interface 1130 may provide the apparatus with radio communication capabilities with terminal devices, for example with the apparatus of FIG. 12, and transmission-reception points, as well as communication capabilities towards different location management services.

Digital signal processing regarding transmission and reception of signals may be performed in a communication controller 1110. The communication interface may comprise standard well-known components such as an amplifier, filter, frequency-converter, (de)modulator, and encoder/decoder circuitries and, in case wireless communication is supported, one or more antennas.

The communication controller 1110 comprises a resource allocation circuitry 1111 configured to allocate resources for reference signal transmissions and to configure measurements and reporting spatial distribution information according to any one of the embodiments/examples/implementations described above. The communication controller 1110 may control the resource allocation circuitry 1111.

In an embodiment, at least some of the functionalities of the apparatus of FIG. 11 may be shared between two physically separate devices, forming one operational entity. Therefore, the apparatus may be seen to depict the operational entity comprising one or more physically separate devices for executing at least some of the processes described with the network apparatus.

Referring to FIG. 12, the apparatus 1200 may further comprise a communication interface 1230 comprising hardware and/or software for realizing communication connectivity according to one or more communication protocols. The communication interface 1230 may provide the apparatus 1200 with communication capabilities with the apparatus of FIG. 11 and communication capabilities with one or more wireless access networks. The communication interface may comprise standard well-known analog components such as an amplifier, filter, frequency-converter and circuitries, conversion circuitries transforming signals between analog and digital domains, and one or more antennas. Digital signal processing regarding transmission and reception of signals may be performed in a communication controller 1210.

The communication controller 1210 comprises a spatial distribution measurement circuitry 1211 (spatial distr. measurement) configured to measure and report reference signal transmissions over a plurality of beams as requested according to any one of the embodiments/examples/implementations described above. The communication controller 1210 may control the spatial distribution measurement circuitry 1211.

As used in this application, the term 'circuitry' refers to all of the following: (a) hardware-only circuit implementations, such as implementations in only analog and/or digital circuitry, and (b) combinations of circuits and soft-ware (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 10 may be carried out by an apparatus comprising corresponding means for carrying out at least some of the described processes. The apparatus may comprise separate means for separate phases of a process, or means may perform several phases or the whole process. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments/examples/implementations described herein.

According to yet another embodiment, the apparatus carrying out the embodiments/examples comprises a circuitry including at least one processor and at least one memory including computer program code. When activated, the circuitry causes the apparatus to perform at least some of the functionalities according to any one of the embodiments/examples/implementations of FIGS. 2 to 10, or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the apparatuses (nodes) described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments/examples/implementations as described may also be carried out in the form of a computer process defined by a computer program or portions thereof. Embodiments of the methods described in connection with FIGS. 2 to 10 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium, for example. Coding of software for carrying out the embodiments as shown and described is well within the scope of a person of ordinary skill in the art. In an embodiment, a computer-readable medium comprises said computer program.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor; and at least one memory including computer program code, the at least one memory and computer program code configured to, with the at least one processor, cause the apparatus at least to perform:

transmitting to a terminal device a request to measure and report spatial distribution metrics of reference signal transmissions over a plurality of beams from a plurality of transmission-reception points;

receiving from the terminal device one or more measurement reports;

using spatial distribution metrics information over the plurality of beams in the measurement reports to determine whether one or more time-frequency resources used by one beam are re-usable by at least another beam; and based on a determination that the one or more time-frequency resources are re-usable for the terminal device, reconfiguring position reference signal transmissions from transmission-reception points having two or more beams to use the one or more time-frequency resources for position reference signal transmissions.

2. The apparatus of claim 1, wherein the at least one memory and computer program code configured to, with the at least one processor, cause the apparatus further to at least to perform:

transmitting in the request one or more thresholds indicating when two or more beams measured are sufficiently spatially separable to allow re-use of the one or more time-frequency resources.

3. The apparatus of claim 1, wherein the at least one memory and computer program code configured to, with the at least one processor, cause the apparatus further to at least to perform:

checking reference signal types available for measurements at the terminal device;

selecting one or more reference signal types to be measured; and transmitting in the request information on the one or more reference signal types selected.

4. The apparatus of claim 1, wherein the at least one memory and computer program code configured to, with the at least one processor, cause the apparatus further to at least to perform:

requesting to measure and report difference in sparsity and/or difference in delays and/or difference in downlink angles of arrival and/or difference in reception powers and/or one or more groups of beams that are spatially separable.

5. The apparatus of claim 1, wherein the at least one memory and computer program code configured to, with the at least one processor, cause the apparatus further to at least to perform:

transmitting to a second terminal device a request to measure and report spatial distribution metrics of reference signal transmissions;

receiving from the second terminal device one or more measurement reports; and in response to determining that the one or more time-frequency resources, which are reusable for the terminal device, are not re-usable for the second terminal device, transmitting to the second terminal device information not to measure reference signal transmissions transmitted on the reusable time-frequency resources.

6. An apparatus comprising at least one processor; and at least one memory including computer program code, the at least one memory and computer program code configured to, with the at least one processor, cause the apparatus at least to perform:

receiving, from a location management point, a request to measure spatial distribution metrics of reference signal transmissions from a plurality of transmission-reception points;

performing one or more measurements on the reference signal transmissions received over a plurality of beams from the plurality of the transmission-reception points;

transmitting spatial distribution information based on the one or more measurements in one or more reports to the location management point; and receiving, from the location management point, information not to measure reference signal transmissions transmitted on reusable time-frequency resources, based on a determination that the reusable time-frequency resources, which are reusable for another terminal device, are not re-usable for the apparatus.

7. The apparatus of claim 6, wherein the at least one memory and computer program code configured to, with the at least one processor, cause the apparatus further at least to perform:

sweeping through at least part of reception beams of the apparatus; and determining and reporting, per a detected beamed reference signal, difference in sparsity and/or difference in delays and/or difference in downlink angle of arrival and/or difference in reception power and/or one or more groups of spatially separable transmission-reception points.

8. The apparatus of claim 6, wherein the at least one memory and computer program code configured to, with the at least one processor, cause the apparatus further to at least to perform:

measuring downlink angle of arrival to a direction of a reception beam to determine downlink angle of arrival.

9. The apparatus of claim 6, wherein the at least one memory and computer program code configured to, with the at least one processor, cause the apparatus further to at least to perform:

using, per a beam, a direction of strongest multipath component to estimate a refined angle of arrival; and determining and reporting difference in downlink angle of arrival using the refined angle of arrival.

10. The apparatus of claim 6, wherein the at least one memory and computer program code configured to, with the at least one processor, cause the apparatus further to at least to perform:

reporting measurement results that are above a threshold, which indicates when two or more beams measured are sufficiently spatially separable to allow re-use of the one or more time-frequency resources, wherein the threshold is preset to the apparatus or received in the request from the location management point.

11. The apparatus of claim 6, wherein the at least one memory and computer program code configured to, with the at least one processor, cause the apparatus further to at least to perform:

determining trust level per a difference to be reported; and associating in a report the difference with its trust level.

12. The apparatus of claim 6, wherein the at least one memory and computer program code configured to, with the at least one processor, cause the apparatus further to at least to perform:

transmitting the measured spatial distribution information in an on-demand positioning request.

13. A method performed by a terminal device, the method comprising:

receiving, from a location management point, a request to measure spatial distribution metrics of reference signal transmissions from a plurality of transmission-reception points;

performing one or more measurements on the reference signal transmissions received over a plurality of beams from the plurality of the transmission-reception points;

transmitting spatial distribution information based on the one or more measurements in one or more reports to the location management point; and receiving, from the location management point, information not to measure reference signal transmissions transmitted on reusable time-frequency resources, based on a determination that the reusable time-frequency resources, which are reusable for another terminal device, are not re-usable for the terminal device.

14. The method of claim 13, the method further comprising:

sweeping through at least part of reception beams of the terminal device; and determining and reporting, per a detected beamed reference signal, difference in sparsity and/or difference in delays and/or difference in downlink angle of arrival and/or difference in reception power and/or one or more groups of spatially separable transmission-reception points.

15. The method of claim 13, the method further comprising:

measuring downlink angle of arrival to a direction of a reception beam to determine downlink angle of arrival.

16. The method of claim 13, the method further comprising:

using, per a beam, a direction of strongest multipath component to estimate a refined angle of arrival; and determining and reporting difference in downlink angle of arrival using the refined angle of arrival.

17. The method of claim 13, the method further comprising:

reporting measurement results that are above a threshold, which indicates when two or more beams measured are sufficiently spatially separable to allow re-use of the one or more time-frequency resources, wherein the threshold is preset to the terminal device or received in the request from the location management point.

18. The method of claim 13, the method further comprising:

determining trust level per a difference to be reported; and associating in a report the difference with its trust level.

19. The method of claim 13, the method further comprising:

transmitting the measured spatial distribution information in an on-demand positioning request.

* * * * *